United States Patent
Covelli

(10) Patent No.: US 12,252,308 B2
(45) Date of Patent: *Mar. 18, 2025

(54) PAPERBOARD TRAYS WITH RECYCLABLE INTERIOR LINER FORMING LEAKPROOF CORNERS

(71) Applicant: Innovative Fiber, LLC, Delafield, WI (US)

(72) Inventor: Jeffrey S. Covelli, Delafield, WI (US)

(73) Assignee: Innovative Fiber, LLC, Delafield, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/126,658

(22) Filed: Dec. 18, 2020

(65) Prior Publication Data

US 2021/0198001 A1 Jul. 1, 2021

Related U.S. Application Data

(60) Provisional application No. 62/953,725, filed on Dec. 26, 2019.

(51) Int. Cl.
| | | |
|---|---|---|
| *B65D 5/56* | (2006.01) | |
| *B31B 50/10* | (2017.01) | |
| *B31B 50/73* | (2017.01) | |
| *B65D 5/00* | (2006.01) | |
| *B65D 5/24* | (2006.01) | |
| *B65D 5/26* | (2006.01) | |

(Continued)

(52) U.S. Cl.
CPC ............ *B65D 5/4279* (2013.01); *B31B 50/10* (2017.08); *B31B 50/73* (2017.08); *B65D 5/0015* (2013.01); *B65D 5/248* (2013.01); *B65D 5/26* (2013.01); *B65D 5/563* (2013.01); *B65D 5/603* (2013.01)

(58) Field of Classification Search
CPC ........ B65D 5/248; B65D 5/241; B65D 5/563; B65D 5/56; B65D 5/245; B65D 5/258; B65D 5/4279; B65D 5/30–308
USPC .... 229/164.2, 5.84, 186–188, 177, 149–153, 229/190, 193–194, 195–197
See application file for complete search history.

(56) References Cited

U.S. PATENT DOCUMENTS 2,239,398 A * 4/1941 Palmer ..................... B65D 5/26
229/87.08
2,430,610 A * 11/1947 Reynolds ............... B65D 5/603
229/905

(Continued)

*Primary Examiner* — Nathan J Newhouse
*Assistant Examiner* — Phillip D Schmidt
(74) *Attorney, Agent, or Firm* — Boyle Fredrickson S.C.

(57) ABSTRACT

An apparatus and method utilizes a forming machine which includes a mandrel and forming plate each shaped to conform the paperboard and/or corrugated material blank passing through the mandrel into the desired configuration for a leak-proof tray. The blank includes a layer of a suitable paperboard and/or corrugated material, and a layer of leakproof plastic or paper material disposed over one side of the corrugated material. The corrugated material includes cutouts at each corner of the blank that enable the sides and ends of the blank to be folded relative to one another. The paper material continuously overlaps the surface of the corrugated layer and these cutouts to provide a continuous leak-proof barrier layer within the formed tray and at the corners of the blank when folded to form the tray, as the paper material is folded over itself to form a bellows corner in the tray.

15 Claims, 13 Drawing Sheets

(51) Int. Cl.
    *B65D 5/42*         (2006.01)
    *B65D 5/60*         (2006.01)

(56) References Cited

U.S. PATENT DOCUMENTS

| | | | | |
|---|---|---|---|---|
| 2,568,170 | A * | 9/1951 | Ringler | B65D 5/603 |
| | | | | 229/149 |
| 2,617,579 | A * | 11/1952 | Buttery | B65D 5/302 |
| | | | | 229/195 |
| 2,665,835 | A * | 1/1954 | Bergstein | B65D 5/603 |
| | | | | 229/5.84 |
| 2,785,845 | A * | 3/1957 | Stenger | B65D 5/6664 |
| | | | | 229/5.81 |
| 2,837,261 | A * | 6/1958 | Stenger | B65D 5/247 |
| | | | | 229/192 |
| 3,520,441 | A * | 7/1970 | Fitzgerald | B65D 43/021 |
| | | | | 206/519 |
| 3,900,158 | A * | 8/1975 | Berkhouse | B65D 5/5435 |
| | | | | 229/125.05 |
| 4,871,111 | A * | 10/1989 | Mode | B65D 5/2047 |
| | | | | 229/5.84 |
| 5,100,016 | A * | 3/1992 | Wischusen, III | B65D 5/248 |
| | | | | 229/103.11 |
| 6,102,281 | A * | 8/2000 | Lafferty | B65D 81/3453 |
| | | | | 426/107 |
| 6,863,212 | B2 * | 3/2005 | Stone | B65D 5/6655 |
| | | | | 229/128 |
| 7,870,995 | B1 * | 1/2011 | Kaltman | B65D 5/40 |
| | | | | 229/175 |
| 2005/0051461 | A1 * | 3/2005 | Bryant | B65D 5/6626 |
| | | | | 206/769 |
| 2007/0080200 | A1 * | 4/2007 | Hamblin | A21B 3/131 |
| | | | | 229/171 |
| 2012/0228365 | A1 * | 9/2012 | Dunbar | B65D 27/14 |
| | | | | 229/80 |
| 2018/0118405 | A1 * | 5/2018 | Walling | B65D 5/443 |

\* cited by examiner

PAPERBOARD TRAYS WITH RECYCLABLE INTERIOR LINER FORMING LEAKPROOF CORNERS

CROSS-REFERENCE TO RELATED APPLICATIONS

This application claims priority from U.S. Provisional Patent Application Ser. No. 62/953,725, filed Dec. 26, 2019, the entirety of which is expressly incorporated herein by reference for all purposes.

FIELD OF THE DISCLOSURE

The present invention relates generally to paperboard and corrugated trays, and more specifically to trays formed from paperboard and/or corrugated boards.

BACKGROUND OF THE DISCLOSURE

When thrilling trays from paperboard and/or corrugated boards, i.e., materials having paperboard liners disposed on each side of a corrugated interior layer, blanks of the corrugated materials are run through a forming machine that deforms different portions of the boards in order to shape the board into the desired form for the tray. The forming machine utilizes a forming plate that presses the blanks through an aperture formed in a mandrel to deforms the corrugated material blank to fold portions of the blank relative to one another, and often to overlap portions of the blank to form joints or continuous surfaces, such as corner and side walls, of the tray.

Due to the rigidity of the materials forming the corrugated boards, the pressure applied to the boards via the forming machine is insufficient to overcome the shape memory of the paperboard and corrugated board materials, such that the blanks formed of these boards, and in particular the overlapped portions of the blanks at the corners of the tray, will tend to return to the original blank configuration of the boards after processing by the forming machine without additional securing or forming materials being used to hold the tray in the formed configuration.

To accommodate for and/or overcome this shape memory, in many instances, the material forming the tray can be altered, e.g., scored or perforated, along the edges where the material is deformed in order to remove and/or reduce the shape memory from the material at those locations. However, in situations where the tray is required to be leak-proof, the formation of any openings, such as perforations, in the materials forming the tray cannot be utilized.

Alternatively or in addition to the perforations, the added securing or thrilling materials come in the form of adhesives that are added to various portions of the paperboard and/or corrugated board as it is being formed in order to adhere portions of the board to one another and assist the hoard in retaining the shape of the tray. These adhesives are particularly useful in forming trays from the paperboard and corrugated board materials that are leak-proof. By applying the adhesive to the overlapped portions of the tray, the adhesive can securely engage and retain the overlapped portions of the tray in the desired configuration.

However, to form the leak-proof or bellows corners in the tray, it is necessary to overlap multiple e.g., three thicknesses of the material forming the tray. While providing a suitable leak-proof corner, the size or thickness of the number of overlapped portions of the tray forming the corners is necessarily limited as much as possible to reduce the amount of material required for the formation of the tray. As such, the amount of overlap of the portions of the tray forming the corners is limited to the areas immediately adjacent the corners of the tray.

One significant drawback with the limited overlap for the bellows corners is the lack of support for the side edges of the tray. Due to the length of the sides between adjacent corners of the tray, the shape memory of the materials forming the tray is not removed by the corners. As such, the sides of the tray bow outwardly at angles between 15° to 20° from vertical, which is highly undesirable, particularly in applications where the tray is utilized to prepare food items retained therein. In addition, for transportation purposes, the bowing of the sides of the tray prevents the trays from being able to be nested for shipment of the trays.

As a result, it is desirable to develop an apparatus and method for forming leak-proof trays from paperboard and/or corrugated boards that enables the trays to retain a desirable profile along the sides of the tray after formation of the tray.

SUMMARY OF THE DISCLOSURE

According to one exemplary aspect of the present disclosure, the apparatus and method utilizes a forming machine which includes a mandrel and forming plate each shaped to conform the paperboard and/or corrugated material blank passing through the mandrel into the desired configuration for a leak-proof tray. The blank includes a layer of a suitable paperboard and/or corrugated material, and a layer of leak-proof paper or film material disposed over one side of the corrugated material. The corrugated material includes cutouts at each corner of the blank that enable the sides and ends of the blank to be folded relative to one another. The paper material continuously overlaps the entire surface of the corrugated layer and these cutouts to provide a continuous leak-proof barrier layer within the formed tray and at the corners of the blank when folded to form the tray, as the paper material is folded over itself within the overlapped thicknesses of the paperboard or cardboard material to form a bellows corner in the tray. The thickness of the paper material is significantly less than that of the paperboard or corrugated materials, such that the corners of the formed tray are thinner than prior art trays.

According to another exemplary aspect of the present disclosure, the corrugated material layer includes perforations, scores or other deformations along the fold lines of the corrugated material layer. The perforations enable the folded portions of the corrugated layer to retain the folded configuration more readily, in order to enable the sides of the tray to be positioned and retained at angles close to perpendicular in the formed tray. Further, the perforations do not degrade the leak-proof nature of the tray due to the presence of the paper layer within the tray.

According to still a further exemplary aspect of the present disclosure, the corrugated material layer includes a stacking tab disposed at each end of the corrugated material layer. The stacking tab is folded partially over the interior of the tray when formed of the blank, and provides a surface on the top of the tray on which other trays can be stably positioned in storage or transport configurations.

Numerous other aspects, features, and advantages of the present disclosure will be made apparent from the following detailed description together with the drawings figures.

BRIEF DESCRIPTION OF THE DRAWINGS

The drawings illustrate the best mode currently contemplated of practicing the present disclosure.

In the drawings.

DETAILED DESCRIPTION OF THE DISCLOSURE

Figure 1:
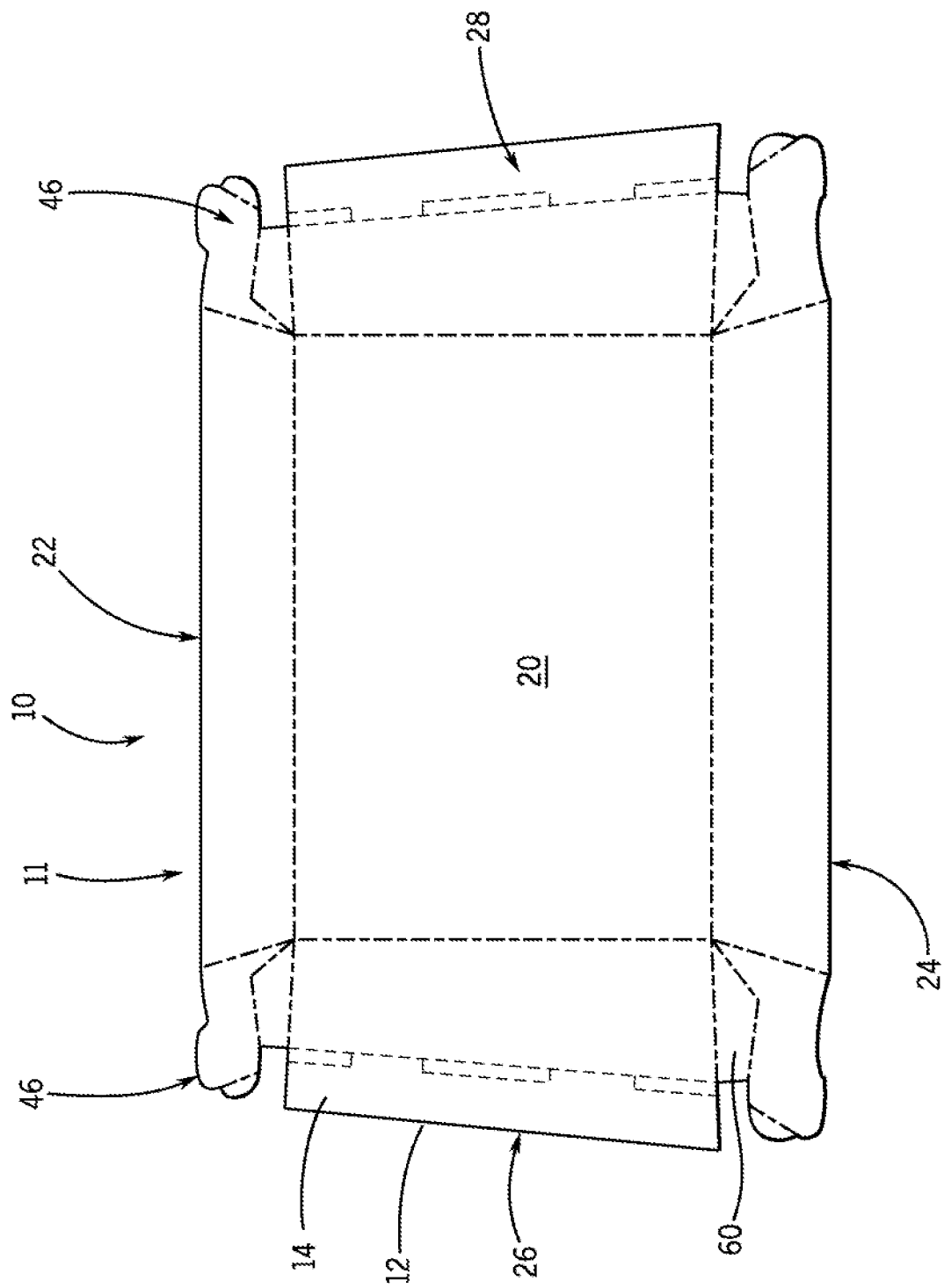
FIG. 1 is a top perspective view of a tray blank constructed according to the present disclosure.
Figure 2:
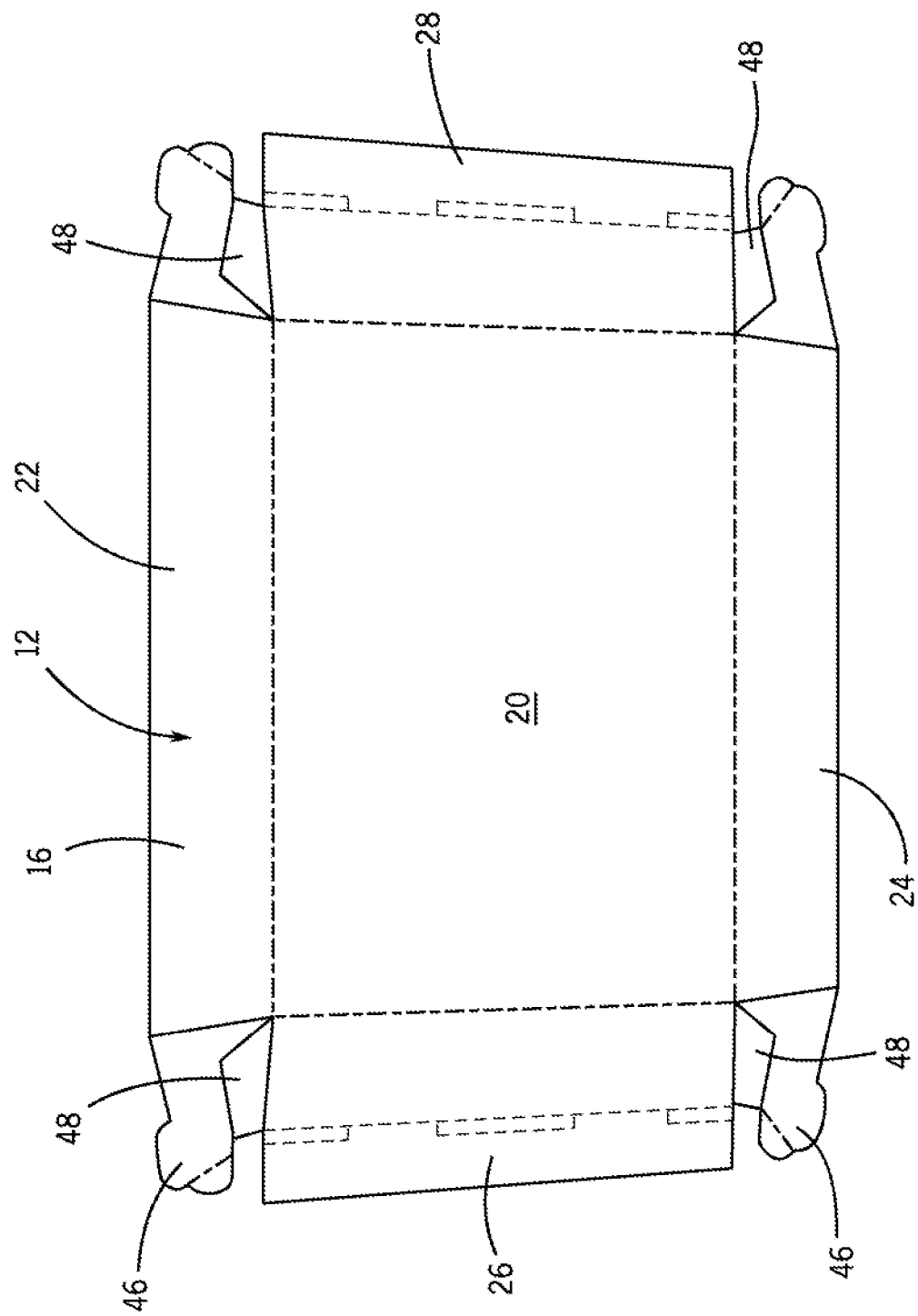
FIG. 2 is a bottom perspective view of the tray blank of FIG. 1.

Referring now in detail to the drawing figures, wherein like reference numerals represent like parts throughout the several views, one embodiment of a tray constructed according to the present disclosure is illustrated generally at 10 in FIGS. 1 and 2. The tray 10 is formed from a blank 11 that includes a first material layer 12 formed of a solid fiber, paperboard or corrugated material, among other suitable materials, which can have any suitable type of coating (not shown) thereon, if desired. The first material layer 12 includes a top surface 14, and a bottom surface 16. The first material layer 12 is optionally separated by a number of score lines or perforation lines 18 into a central section 20, a pair of side walls 22,24 connected to the central section 20, and a pair of end walls 26,28 connected to the central section 20. However, the central section 20, side walls 22,24 and end walls 26,28 of the first material layer 12 may additionally be formed from different materials as desired and subsequently joined to one another using other suitable structures and/or methods, including mechanical devices (not shown), tape and/or adhesives, among others.

Figure 3:
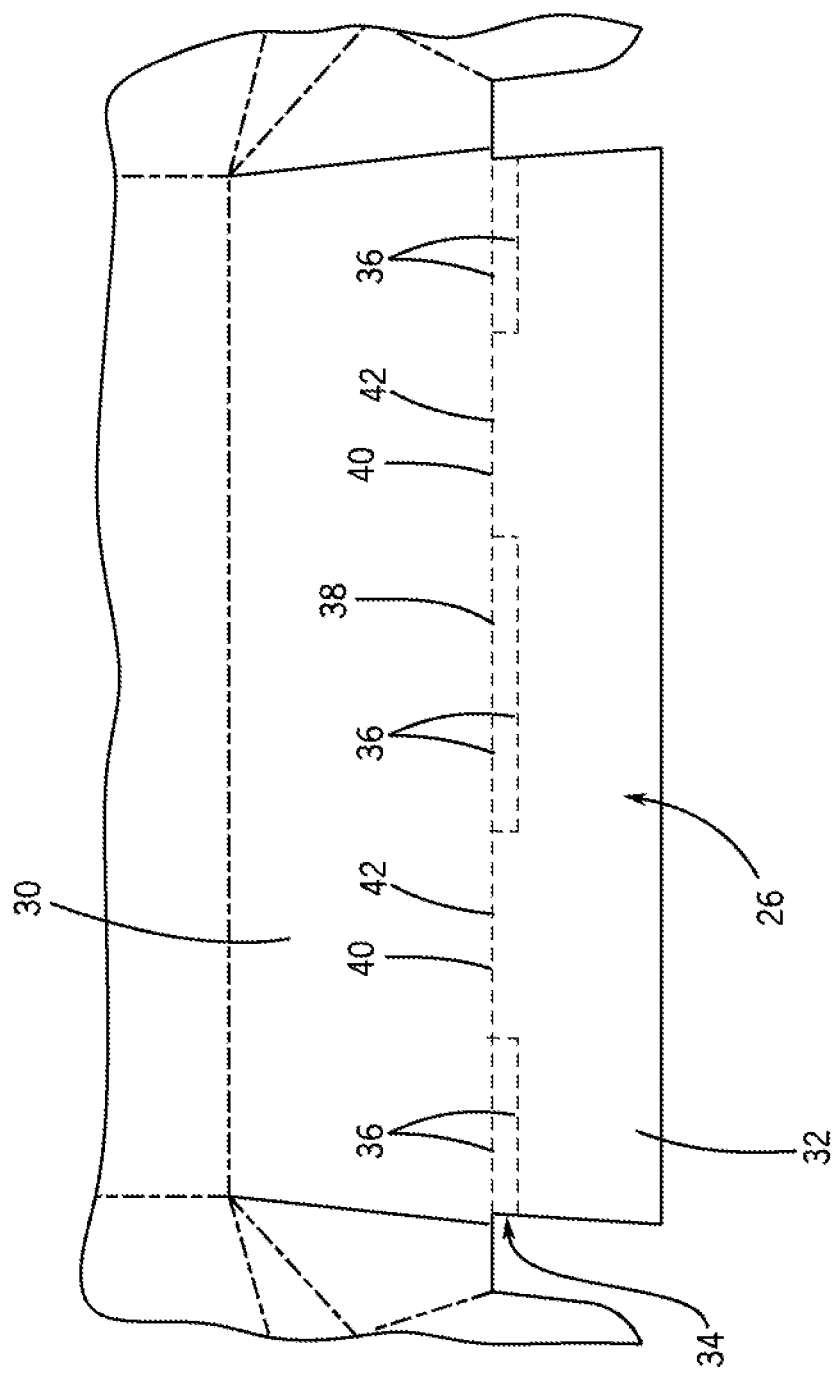
FIG. 3 is a partially broken away perspective view of an end wall of the tray blank of FIG. 1.

Looking at the illustrated exemplary embodiment of FIGS. 1-3, each end wall 26,28 has a length corresponding to that of the adjacent edge of the central section 20, and includes a first end wall portion 30 attached to the central portion 20, and a second end wall portion 32 attached to the first end wall portion 30 opposite the central section 20. The first end wall portion 30 and the second end wall portion 32 are joined by hinge 34 formed with a pair of perforation lines 36 disposed immediately adjacent the first end wall portion 30 and second end wall portion 32, respectively, and spaced from one another. In the space 38 formed between the perforations 36, a pair of slots or openings 40 are formed by die cuts 42 in the space 38.

Figure 4:
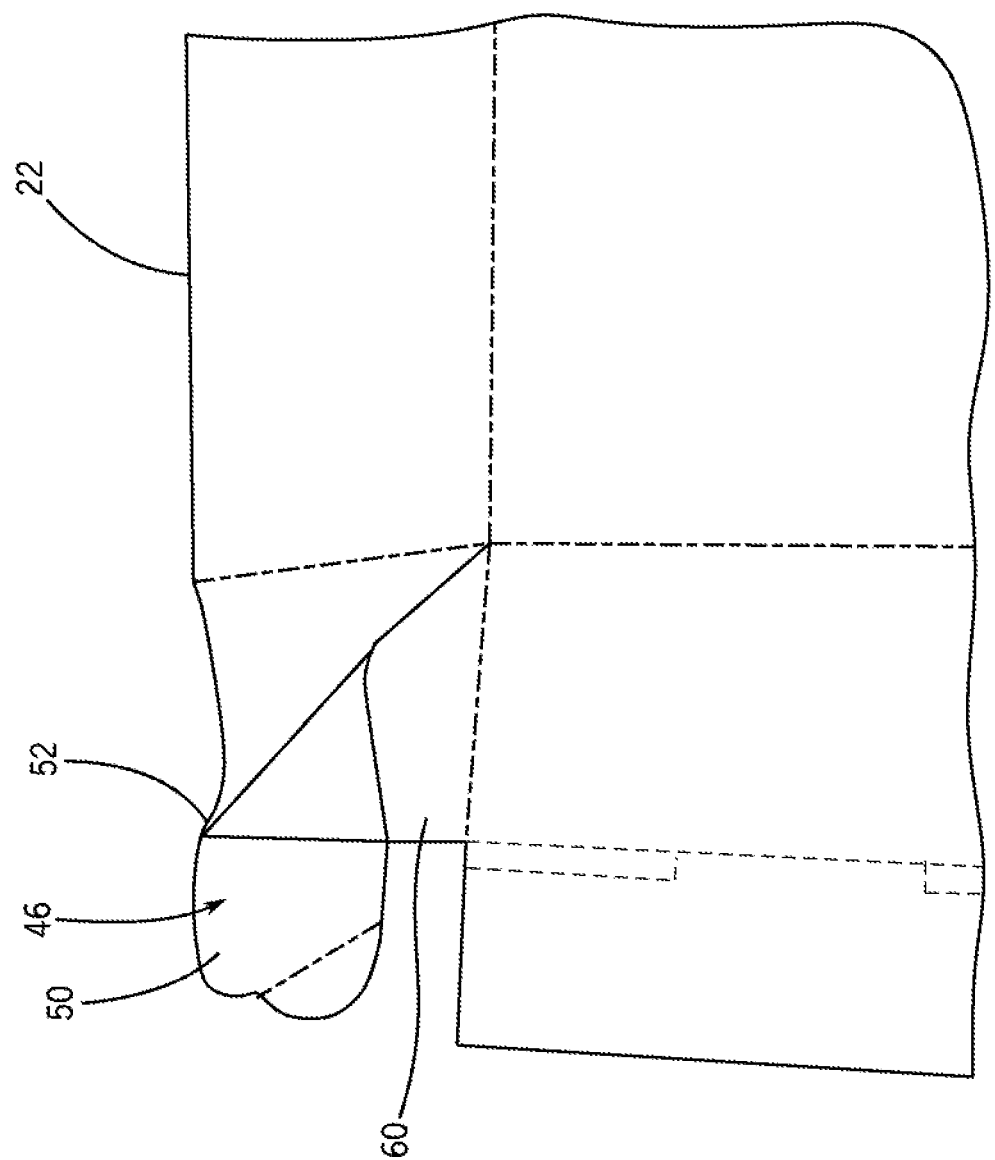
FIG. 4 is a partially broken away perspective view of a side wall of the tray blank of FIG. 1.

Referring now to FIGS. 1-2 and 4, the side walls 22,24 are each formed with a side wall portion 44 that is connected to the central portion 20 along one perforation line 18 and has a length approximately equal to the length of the adjacent edge of the central portion 20. Each side of the side wall portion 44 includes a locking tab or flap 46 extending outwardly therefrom. The locking flaps 46 extend past the dimensions of the central portion 20 to positions adjacent the end walls 26,28, and define a gap or window 48 between the flaps 46 and the end walls 26,28. The flaps 46 additionally include a locking tab 50 opposite the side wall portion 44 and a recess 52 disposed and extending inwardly from the tab 50 along the flaps 46. The particular shape of the first material layer 12 including the various features thereon is created during a die cutting process of a flat preform (not shown) of the first material layer 12, such that the first material layer 12 requires no further processing prior to use in forming the tray 10.

Looking now at FIGS. 1 and 2, the blank 11 additionally includes a second material layer 60 disposed over the top surface 14 of the first material layer 12. The second material layer 60 is formed of a film of any suitable material, such as a recyclable plastic material, such as a polylactic acid (PLA) film material, or a recyclable cellulose material, and in one exemplary embodiment is formed of parchment paper. The second material layer 60 is applied over the central portion 20, the first end wall portions 30, the side wall portions 44, and over at least parts of the locking flaps 46 and gap 48, while leaving the second end wall portions 32 and locking tabs 50 uncovered. The second material layer 60 provides a flexible and leak-proof barrier on the top surface 14 of the blank 11, forming a tray 10 that is recyclable, biodegradable, and compostable and acts as a barrier for moisture as a function of being in direct contact with a food product (not shown) positioned within the tray 10. In addition, there is capability to print directly on the second material layer 60, particularly when the second material layer 60 is formed of a clear or opaque film.

Figure 10:
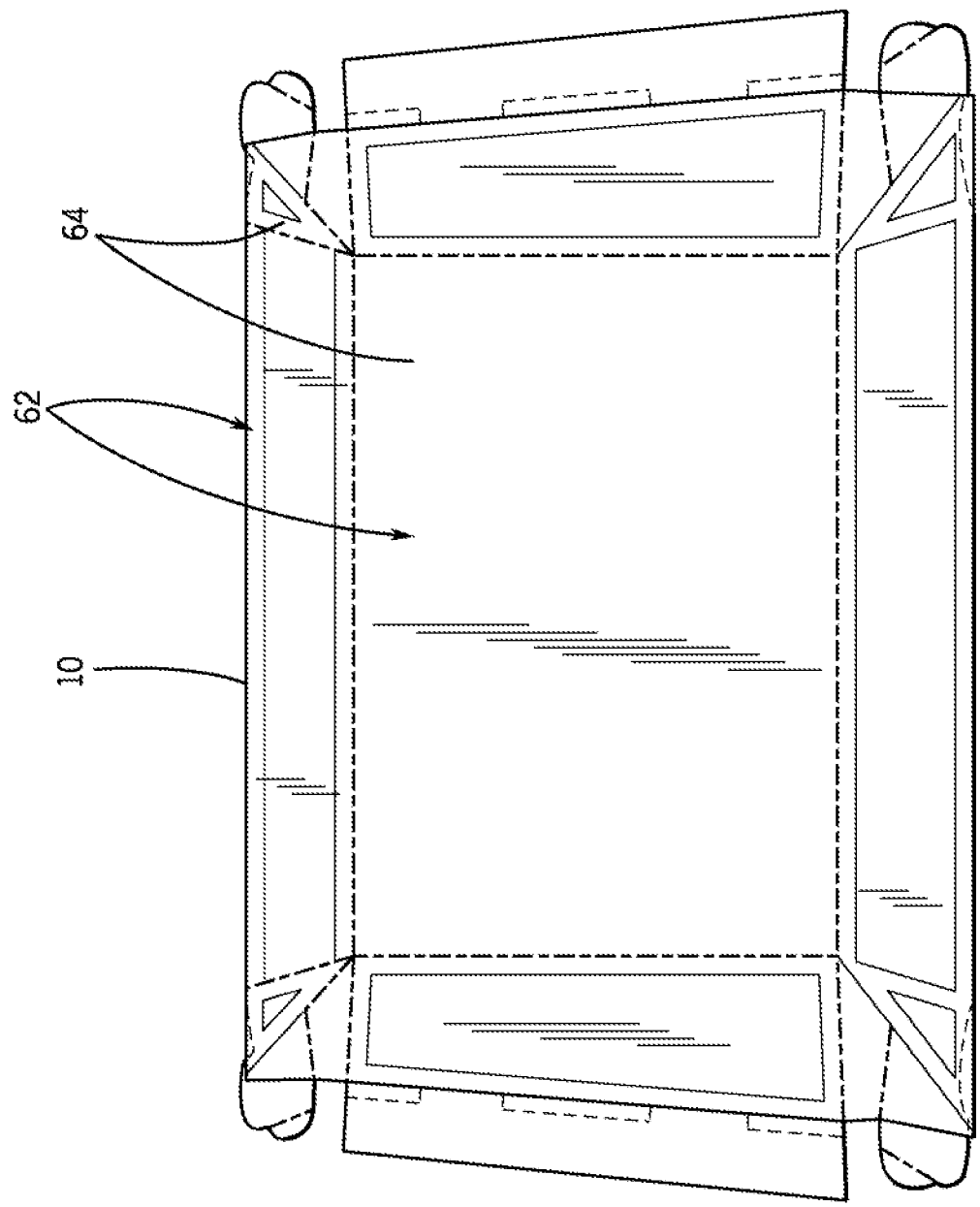
FIG. 10 is a top perspective view of a second exemplary embodiment of the tray blank of FIG. 1.

The second material layer 60 can be affixed to the top surface 14 of the first material layer 12 in any suitable manner, such as by printing the second material layer 60 directly on the first material layer 12, but in the exemplary embodiment illustrated in FIG. 1, the second material layer 60 is adhered using an adhesive 62. The adhesive 62 is any suitable type of adhesive for use with the tray 10, such as a cold adhesive application, and can be applied to the top surface 14 of the blank 11/first material layer 12 using a roller coater (not shown) with subsequent application of the second material layer 60 to the adhesive 62. The adhesive 62 is applied on the first material layer 12 registering the location of the adhesive 62 on the increased surface area provided by the reduced number of folded sections of the corner of the tray 10, to allow for a secure web and/or leak proof corner 80 in the final construction of the tray 10. In the illustrated exemplary embodiment of FIG. 10, the adhesive 62 can be applied to have a color showing where the adhesive 62 has been applied to the top surface 14 and showing through the second material layer 60, particularly when the second material layer 60 is clear. The orientation or disposition of the adhesive 62 on the blank 11/first material layer 12 by the roller coater can be selected to provide various indicia 64 on the central section 20 and/or walls 22,24,26,28 of the tray 10, which may include cutting length or size indicia for the food item (not shown) disposed within the tray 10 and/or various trademarks indicating the source of the food item, among others.

In another exemplary embodiment of the disclosure, upon heating of the tray 10, such as to prepare the food item therein, the adhesive 62 degrades, both dissipating the color in the adhesive 62 and enabling the second material layer 60 to be removed from the blank 11, such that the blank 11/first material layer 12 can be recycled separately from second material layer 60.

In another exemplary embodiment, for prior blanks 11/first material layers 12 that include a coating (not shown), in the prior art the corrugated is applied to the blank 11 or to one or more of the layers of materials (not shown) forming the corrugated blank 11 prior to the blank 11 being processed by and/or manufactured on a corrugator (not shown) that uses heat in the manufacturing process to form the blank 11 into the desired configuration and shape for use in forming a container. The temperatures reached by the corrugator can degrade and/or render the coating material applied to one or more portions of the blank 11 inoperable. But, with the application of the second material layer 60 in the present disclosure, e.g., the paper or film layer, over the top of an already corrugated and formed blank 11 in place of a separate coating on the blank 11, the present disclosure provides two very distinct advantages:

1) applying the second material layer 60, e.g., release film or paper, to an already manufactured/die cut blank 11 eliminates the difficulties of corrugating coated materials as the blank 11 can be formed without any coating thereon that could be degraded by the manufacturing process for the blank 11; and
2) applying the second material layer 60 to an already die cut blank 11 including the coated material provides the opportunity to manipulate certain folds with only the paper or film. When coated materials are produced on the corrugator the entire blank contains the coated material.

In another exemplary embodiment of the disclosure, the central section 20 can be formed with a number of apertures 100 therein, as shown in FIGS. 12-15. The apertures 100 can have any configuration and number desired, and extend completely through the central section 20 of the blank 11/first material layer 12 and are covered by the second material layer 60 in the final construction of the tray 10. The apertures 100 enable heat to more readily contact the food item positioned within the tray 10, counteracting the insulating properties of the solid fiber, paperboard or corrugated material forming the blank 11/first material layer 12 and thereby enabling more even and faster heating of the food item in the tray 10.

Figure 6:
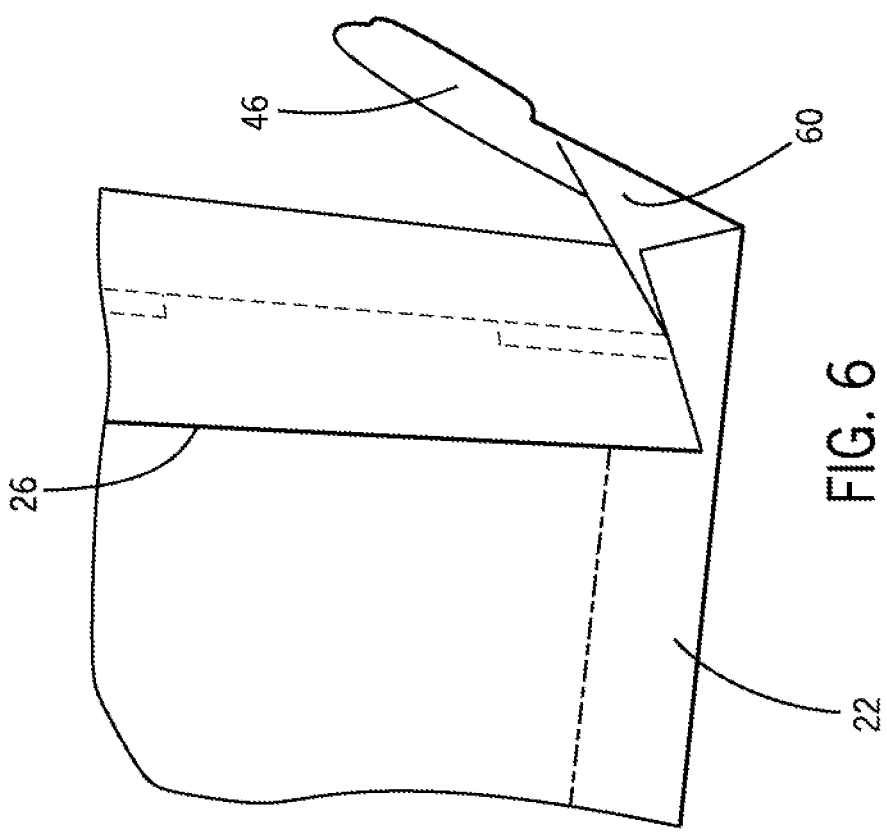
FIG. 6 is a partially broken away perspective view of a second step of assembling a tray from the tray blank of FIG. 1.
Figure 5:
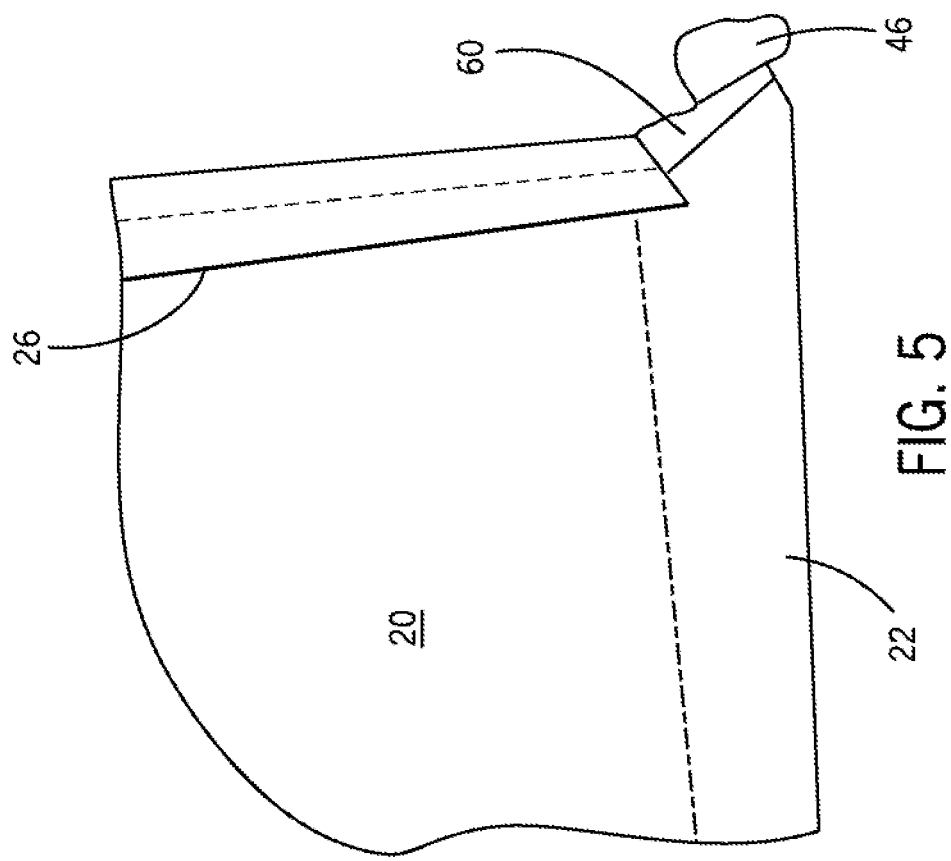
FIG. 5 is a partially broken away perspective view of a first step of assembling a tray from the tray blank of FIG. 1.
Figure 7:
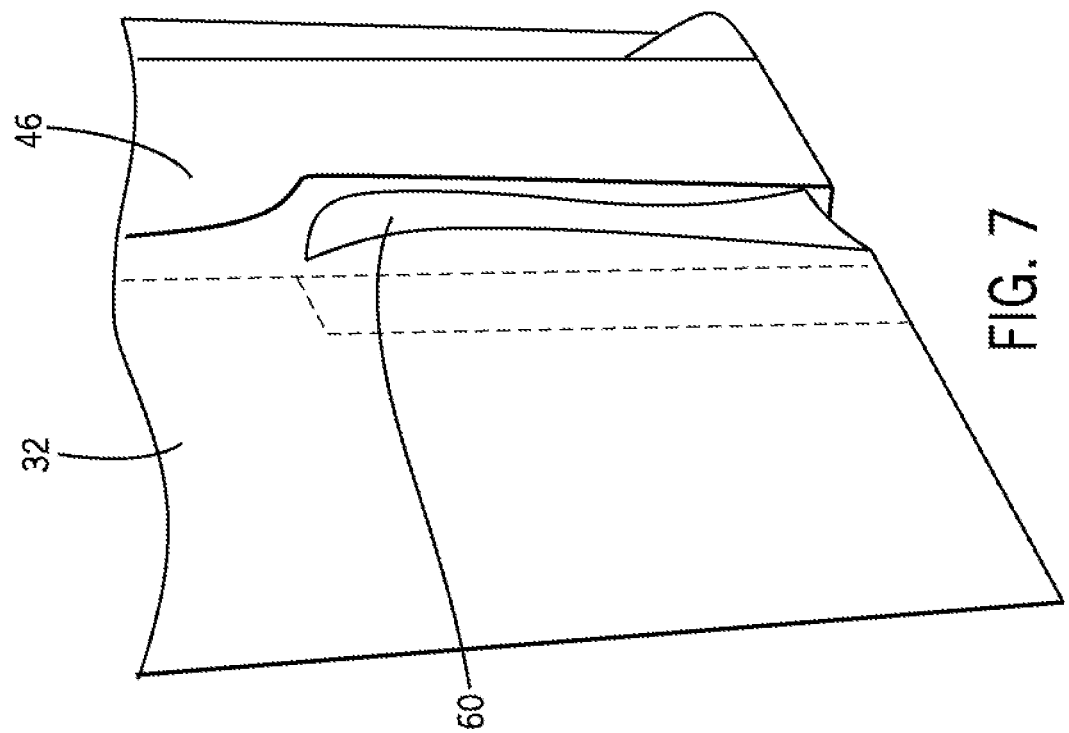
FIG. 7 is a partially broken away perspective view of a third step of assembling a tray from the tray blank of FIG. 1.

Looking now at FIGS. 5-9, an exemplary method of assembling the tray 10 from the blank 11 including the first material layer 12 and the second material layer 60 is illustrated. Initially, as shown in FIG. 5, the end walls 26 and 28 are folded upwardly with regard to the central section 20, which partially folds the area of the second material layer 60 disposed between the end walls 26,28 and the adjacent side walls 22,24. Next, as shown in FIG. 6 the side walls 22,24 are folded upwardly relative to the central section 20 and the locking flaps 46 are folded inwardly towards the associated end walls 26,28. This movement of the side walls 22,24 and the flaps 46 creates a bellows corner in the second material layer 60 between the end wall 26,28 and the side wall 22,24, as shown in FIG. 6. Then, as shown in FIG. 7, the flap 46 is secured against the exposed surface of first end wall portion 30 of the end wall 26,28, to compress and form the leak-proof bellows corner with the second material layer 60 and to form the corner of the tray 10.

While the flap 46 can be secured to the adjacent or associated end wall 26,28 in any suitable manner, in one particular embodiment an adhesive, such as adhesive 62, is placed on the flap 46 to adhere the flap 46 to the adjacent end wall 26,28 and thus form the leak-proof corner 80, as described previously. In one exemplary embodiment, the adhesive 62 is applied to the flap 46 at a forty-five degrees (45°) relative to the corner, such as by an aligned gluing plate (not shown) in order to precisely place the adhesive 62 on the flap 46 in this orientation. The adhesive 62 positioned in this manner allows for the flap 46 to positioned and secured to the end wall 26,28 in the correct location to form the leak-proof corner 80 with the second material layer 60.

Figure 8:
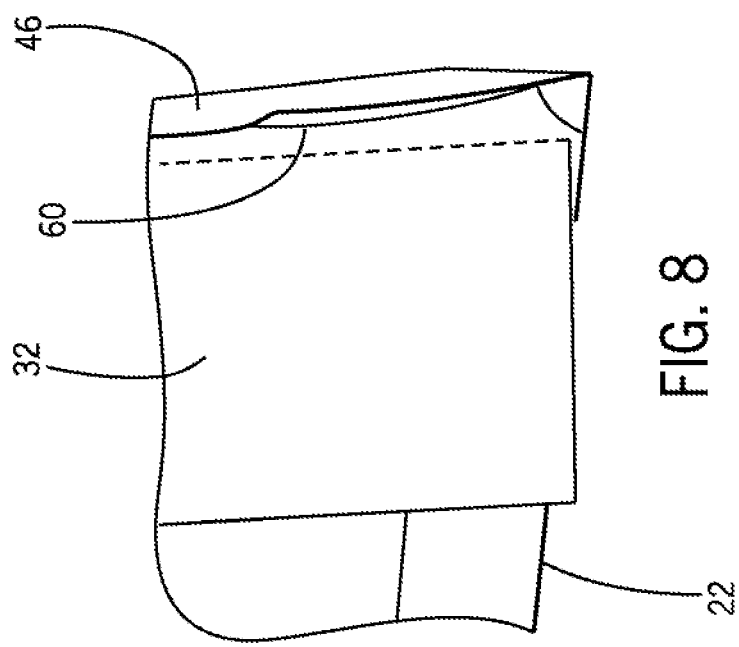
FIG. 8 is a partially broken away perspective view of a fourth step of assembling a tray from the tray blank of FIG. 1.
Figure 11:
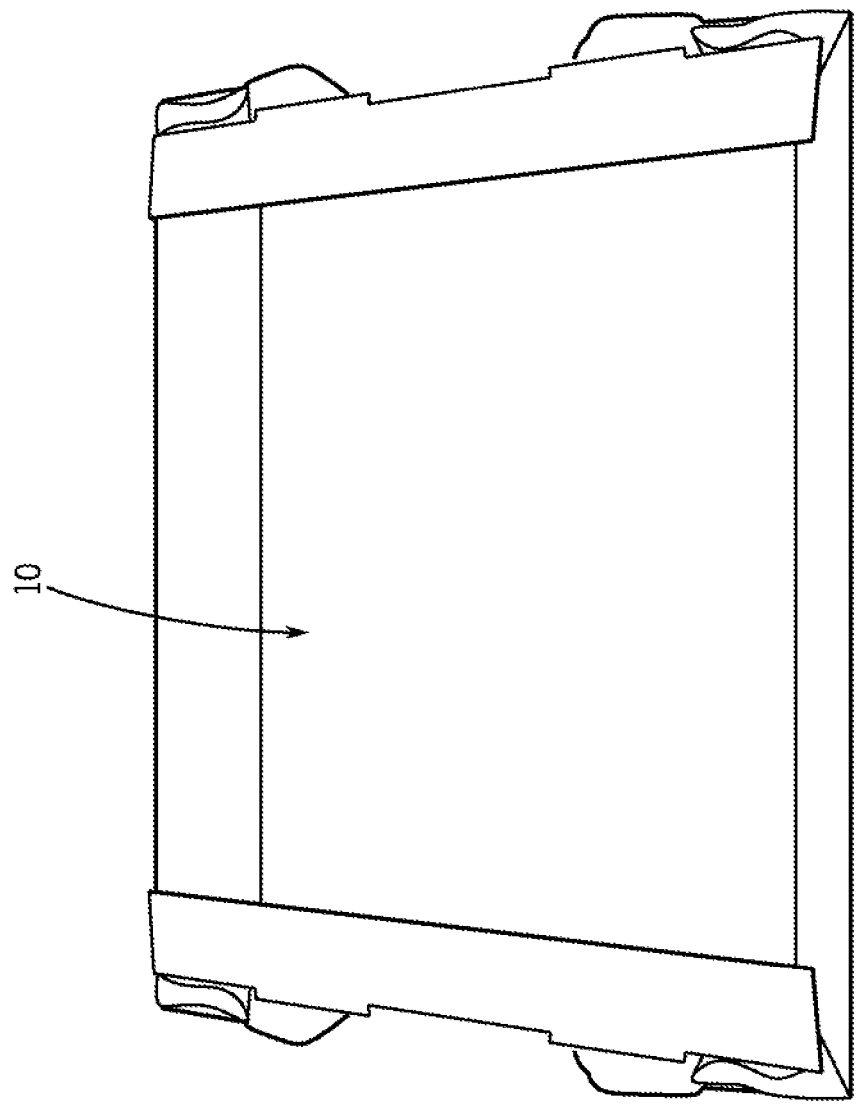
FIG. 11 is a top perspective view of the tray blank of FIG. 1 assembled into a tray.
Figure 12:
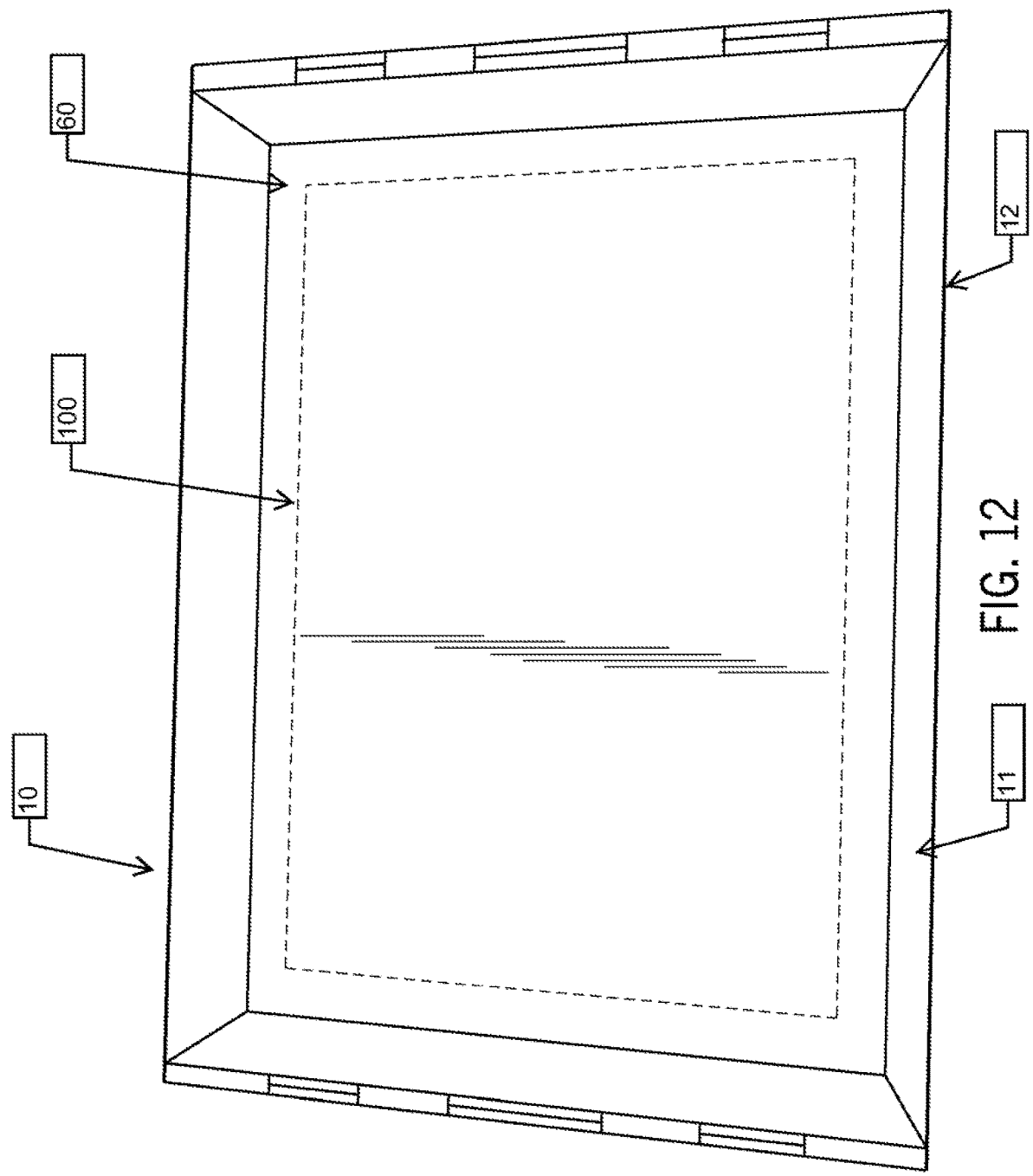
FIG. 12 is a top perspective view of a tray including a first embodiment of number of apertures in a portion of the tray.
Figure 13:
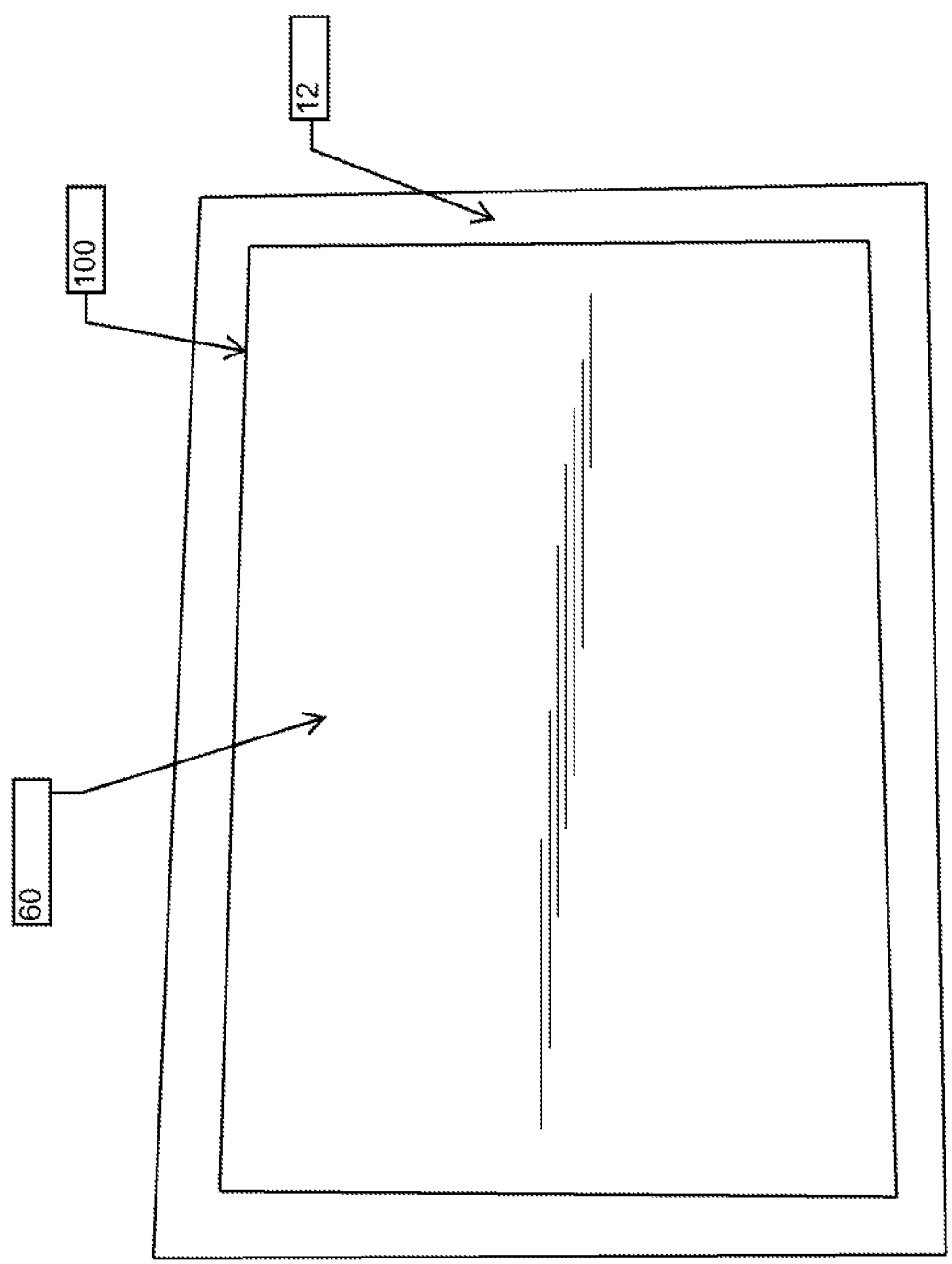
FIG. 13 is a bottom perspective view of the tray of FIG. 12.
Figure 14:
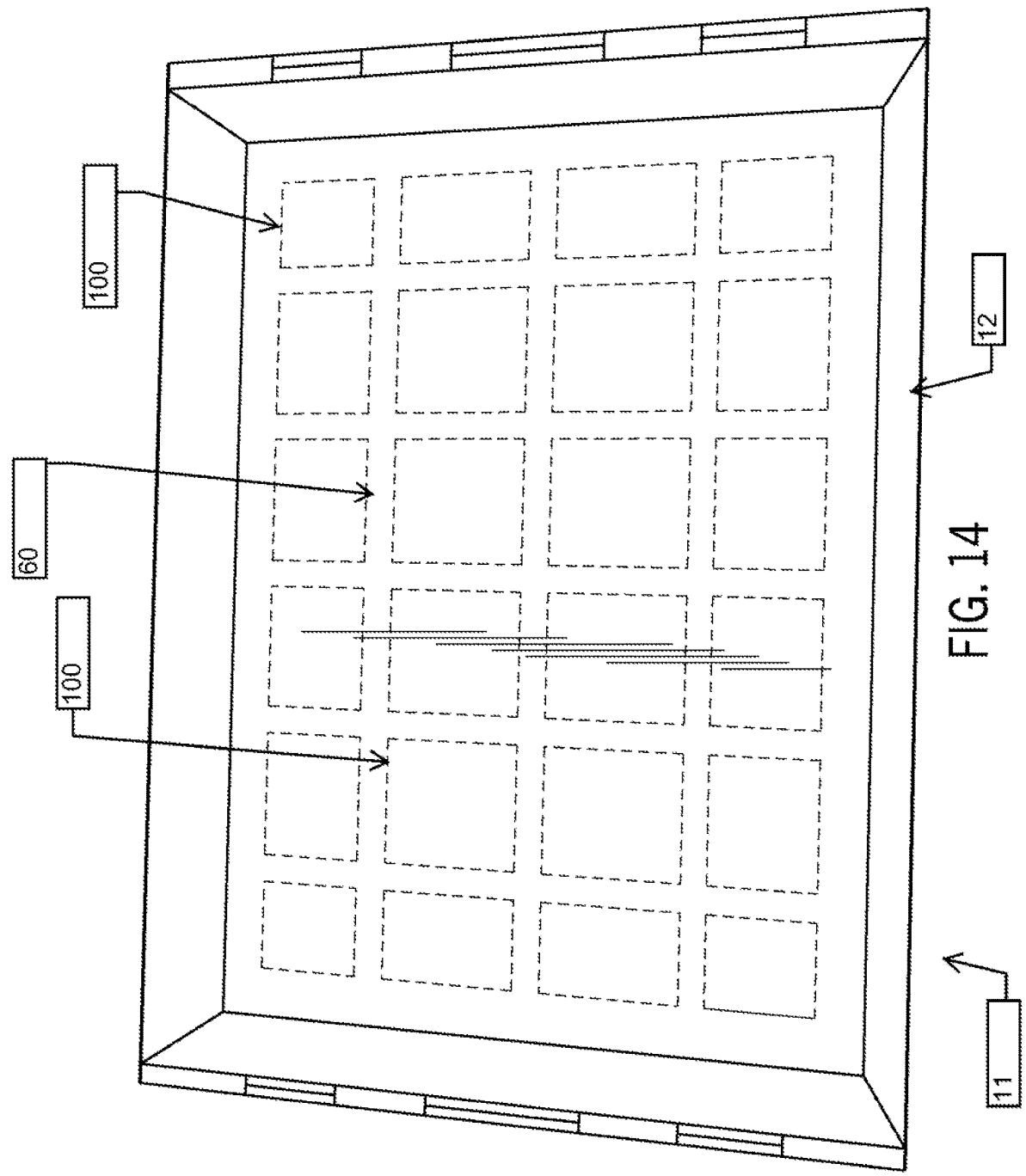
FIG. 14 is a top perspective view of a tray including a second embodiment of number of apertures in a portion of the tray.
Figure 15:
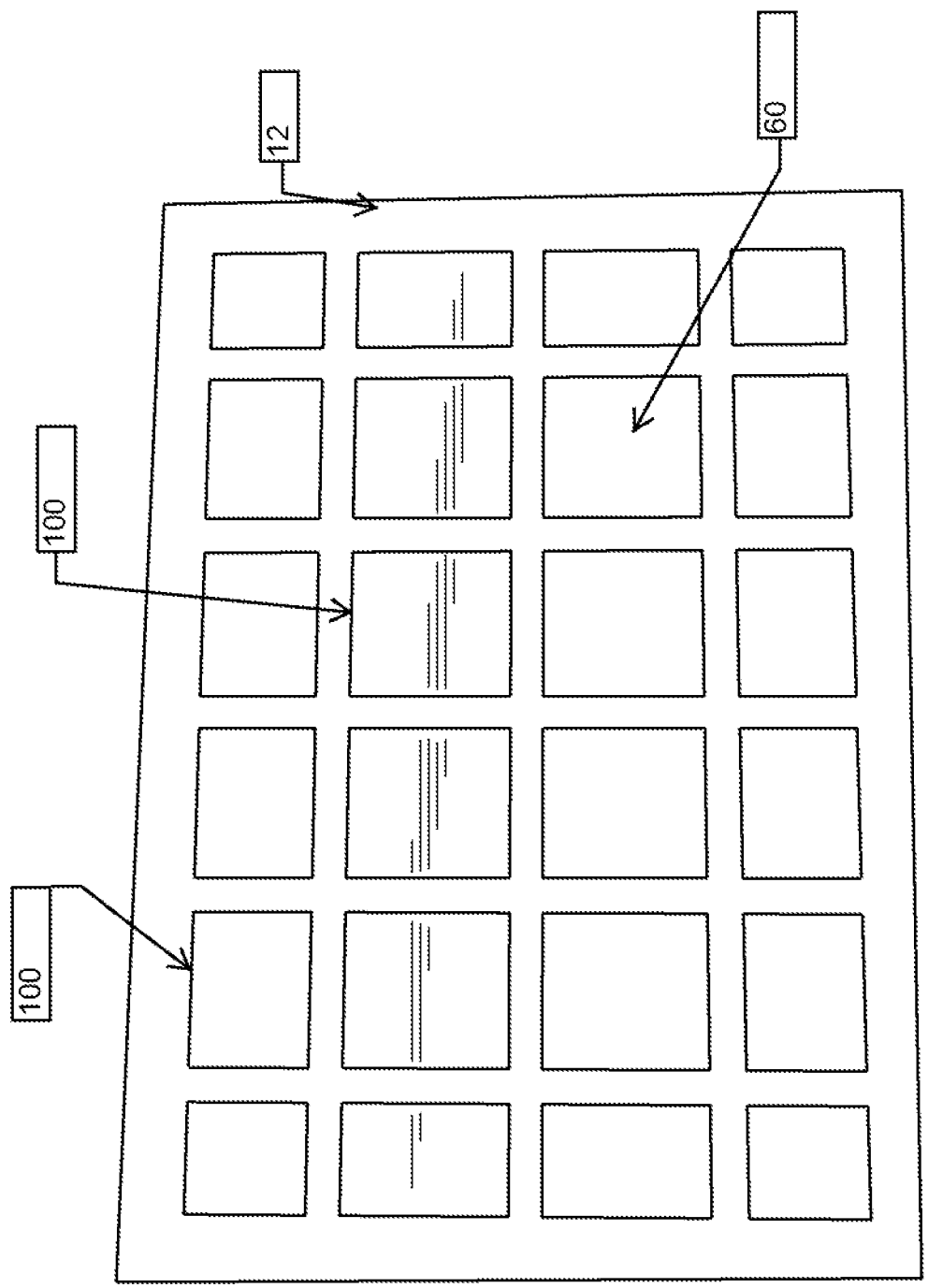
FIG. 15 is a bottom perspective view of the tray of FIG. 14.

Once the flap 46 is attached, as shown in FIG. 8, the second end wall portion 32 can be folded inwardly over the central section 20 relative to the first end wall portion 30. In this position the second end wall portion 32 extends over the associated lengths of the adjacent side walls 22,24 and forms a stacking tab 70 on which additional trays 10 can be positioned for shipment, as best shown in FIG. 11.

With the use of the second material layer 60, the amount or thickness of the material forming the tray 10 at the corners 80 is greatly reduced, e.g., only two thicknesses of the material forming the first material layer 12 as opposed to three thicknesses in prior art trays, resulting in greatly reduced material usage and associated cost. Further, a more vertical position of the side walls 22,24 extending between the corners can be maintained using the perforations in the first material layer 12, such as at an angle of approximately seven (7°) from perpendicular to the central portion 20 as opposed to between fifteen (15°) and twenty (20°) degrees from perpendicular to the central portion 20 in prior art trays, greatly reducing the variation in the width of the tray 10 as opposed to prior art trays. Also, the use of the second material layer 60 to form the leak-proof bellows corners 80 can be maintained to retain the food items therein, even during preparation of the food items, such as by heating or baking the food items directly in the tray 10. Further, in another exemplary embodiment, the folded or "web" corner of second material layer 60 is glued on a forty-five (45°) degree angle which creates the leak proof corner. Additionally, the ability to form the perforation lines 18 in the first material layer 12 more effectively takes the memory out of the material thrilling the first material layer 12 along with allowing gasses to escape the ray 10 through the first material layer 12.

Figure 9:
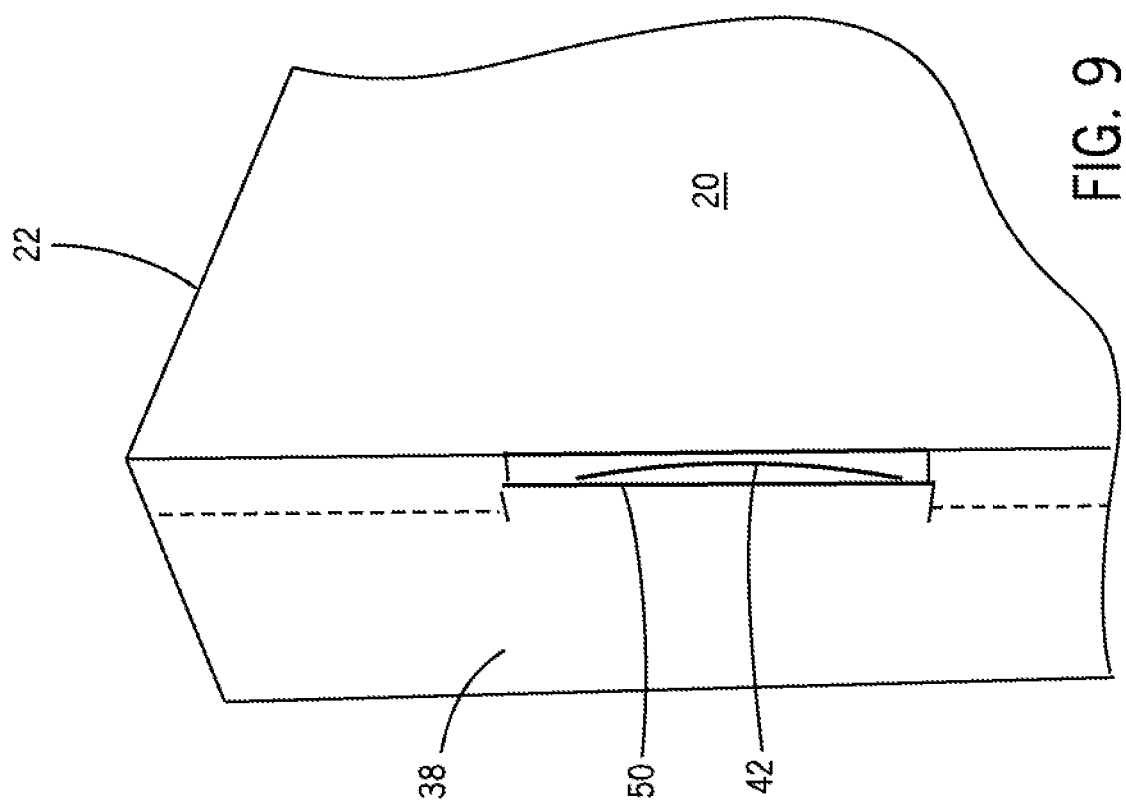
FIG. 9 is a partially broken away perspective view of the tray of FIG. 1 in a storage configuration.

Looking now at FIG. 9, when it is desired to open the tray 10 to access a prepared food item held therein, the locking flaps 46 can be disengaged from the first side wall portion 30 on one side wall 26,28 to enable the end wall 26,28 to be pivoted away from the central section 20, forming and access channel into the interior of the tray 10. If and when it is desired to close the tray 10 to retain the unused portion of the food item therein. The first end wall portion 30 can be pivoted hack to the shipment position and the locking flaps 46 can be repositioned against the first end wall portion 30, The second end wall portion 32 can then be folded over the flaps 46, such that the locking tabs 48 on the flaps 46 become engaged within the openings 40 formed in the space 38 between the first end wall portion 30 and the second end wall portion 32.

Changes can be made in the above constructions and method steps without departing from the scope of the invention, such as by firming a tray 10 and or blank 11 having a polygonal shape other than square or rectangular, and potentially including exclusively foldable sections including locking flaps on one end that are engageable with slots formed in the opposite end of each foldable section, and it is intended that all matter contained in the above description or shown in the accompanying drawings shall be interpreted as illustrative and not in a limiting sense. Various other embodiments of the present invention are contemplated as being within the scope of the filed claims particularly pointing out and distinctly claiming the subject matter regarded as the invention.

The invention claimed is:

1. A food-containing tray comprising:
   a. a first material layer consisting of a single layer of material selected from the group consisting of a solid fiber material, a paperboard material, and a corrugated material, the first material layer including a central section and a number of foldable sections connected to the central section, the number of foldable sections including a pair of opposed side walls and a pair of opposed end walls;
   b. a second material layer applied over the first material layer to enable the second material layer to form leak-proof bellows corners when the foldable sections are folded relative to the central section; and
   c. at least one aperture in the central section of the first material layer that extends completely through the central section of the first material layer and is covered by the second material layer;

wherein adjacent foldable sections are engageable with one another, wherein a first side wall includes at least one locking flap thereon, the at least one locking flap engageable with the adjacent end wall, and wherein the at least one locking flap defines a window between the at least one locking flap and the central section, and wherein the second material layer covers at least part of the window and the at least one locking flap and is disposed at least partially between the at least one locking flap and the adjacent end wall when the at least one locking flap is engaged with the adjacent end wall, and wherein the at least one locking flap extends outwardly past the second material layer.

2. The tray of claim 1 wherein the adjacent end wall includes at least one slot that is engageable with the at least one locking flap.

3. The tray of claim 1 wherein the foldable sections form leakproof corners having only two thicknesses of the first material layer.

4. The tray of claim 1 wherein the second material layer is formed of a cellulose material.

5. The tray of claim 1 wherein the second material layer is secured to the first material layer using an adhesive.

6. The tray of claim 5 wherein the adhesive is a thermally degradable adhesive.

7. The tray of claim 5 wherein the adhesive is a colored adhesive.

8. The tray of claim 7 wherein the colored adhesive provides indicia on the tray.

9. The tray of claim 1 wherein the foldable sections provide a tray with side walls having an angle of approximately seven degrees from perpendicular with respect to the central section.

10. The tray of claim 1 wherein the number of foldable sections are separated from the central section by perforation lines.

11. The tray of claim 1 wherein the second material layer is formed of a recyclable material.

12. The tray of claim 11 wherein the second material layer is formed of a plastic film.

13. A food-containing tray formed of a blank consisting essentially of:
   a. a first material layer consisting of a single layer of material selected from the group consisting of a solid fiber material, a paperboard material, and a corrugated material, the first material layer having a central section and a number of foldable sections connected to the central section, the foldable sections forming opposed side walls and opposed end walls that define an open top for the tray;
   b. a second material layer applied over the first material layer to enable the second material layer to form leak-proof bellows corners when the foldable sections are folded relative to the central section; and
   c. at least one aperture in the central section of the first material layer that extends completely through the central section of the first material layer and is covered by the second material layer.

14. A method for forming a food material tray, the method comprising the steps of:
   a. providing a blank according to claim 13; and
   b. folding the foldable sections relative to the central sections and to one another to form a food material tray including leakproof corners.

15. The method of claim 14 wherein the second material layer is adhered over the first material layer.

* * * * *